United States Patent
Prass et al.

(10) Patent No.: US 11,201,344 B2
(45) Date of Patent: Dec. 14, 2021

(54) METHOD FOR MANUFACTURING A MEMBRANE ASSEMBLY FOR A FUEL CELL WITH CATALYST FREE EDGE AREAS; MEMBRANE ASSEMBLY AND FUEL CELL WITH MEMBRANE ASSEMBLY

(71) Applicants: Daimler AG, Stuttgart (DE); Ford Motor Company, Dearborn, MI (US)

(72) Inventors: Sebastian Prass, Freital (DE); Manpal Ghuman, Surrey (CA); Andrew Leow, Delta (CA); Jennie Eastcott, Oakville (CA); Owen Thomas, Vancouver (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 60 days.

(21) Appl. No.: 16/812,655

(22) Filed: Mar. 9, 2020

(65) Prior Publication Data
US 2021/0280885 A1 Sep. 9, 2021

(51) Int. Cl.
*H01M 8/00* (2016.01)
*H01M 8/1004* (2016.01)
*H01M 4/88* (2006.01)

(52) U.S. Cl.
CPC ......... *H01M 8/1004* (2013.01); *H01M 4/881* (2013.01); *H01M 4/8814* (2013.01); *H01M 4/8896* (2013.01)

(58) Field of Classification Search
CPC .... H01M 2/1077; H01M 2220/20; F16F 1/18; B60L 11/18
See application file for complete search history.

(56) References Cited

U.S. PATENT DOCUMENTS

2010/0288629 A1* 11/2010 LaConti .............. C25B 9/19
204/252

FOREIGN PATENT DOCUMENTS

KR 1020070056605 A 6/2007

\* cited by examiner

*Primary Examiner* — Cynthia H Kelly
*Assistant Examiner* — Monique M Wills
(74) *Attorney, Agent, or Firm* — Patent Central LLC; Stephan A. Pendorf

(57) ABSTRACT

A method for manufacturing a membrane assembly for a fuel cell. To overcome a problem of chemical degradation at an edge of the membrane, the method comprises the following steps:
positioning a first decal layer, which is made of the same material as a first catalyst layer, on a first side of the membrane,
positioning a second decal layer, which is made of the same material as a second catalyst layer, on a second side of the membrane,
pressing a compression pad, which is positioned on the first decal layer with the first decal layer and the second decal layer fully overlapping the compression pad, and the second decal layer against each other with the first decal layer and the membrane positioned in-between, whereby pressure on the first and the second decal layer is applied only in an area covered by the compression pad.

9 Claims, 3 Drawing Sheets

METHOD FOR MANUFACTURING A MEMBRANE ASSEMBLY FOR A FUEL CELL WITH CATALYST FREE EDGE AREAS; MEMBRANE ASSEMBLY AND FUEL CELL WITH MEMBRANE ASSEMBLY

BACKGROUND OF THE INVENTION

Field of the Invention

The invention relates to a method for manufacturing a membrane assembly for a fuel cell, which membrane assembly comprises a membrane with a first side and a second side, and a first catalyst layer arranged on the first side of the membrane and a second catalyst layer arranged on the second side of the membrane, wherein the first catalyst layer and the second catalyst are at least substantially fully overlapping each other with respect to their extension parallel to the membrane. Another aspect of the present invention relates to a membrane assembly for a fuel cell which is manufactured by the above mentioned method. A further aspect of the invention relates to a fuel cell with said membrane assembly.

Description of the Related Art

Membrane assemblies, also often referred to as membrane electrode assembly (MEA), are well-known for usage in a fuel cell. If such a membrane assembly comprises a frame, it is also referred to a membrane electrode frame assembly (MEFA). A fuel cell is configured to convert a fuel, for example, hydrogen, into electrical energy, in particular an electrical voltage resulting in an electrical current, when a power circuit is closed.

The membrane assembly for the fuel cell comprises the membrane, also referred to as electrolyte, and the first and second catalyst layer, which also can be referred to as electrodes. A multitude of fuel cells can be combined to a stack of fuel cells. Each of the fuel cells of the stack can comprise a respective membrane assembly.

Document KR 2007 005 66 05 A reveals a membrane for a fuel cell which membrane is surrounded by two catalyst activation parts both overlapping the edges of the membrane:

Current membrane assemblies, membrane electrode frame assemblies in particular, are proned to failures at an edge between the frame and the catalyst layers. Such failures can be caused by chemical degradation in the region where the catalyst layer and the frame face each other. In this region, where the frame and the catalyst layer face, can be a gas diffusion layer, which goes over the frame. Such a gas diffusion layer may be arranged on both surfaces of the membrane assembly. The chemical degradation can be caused by a so-called "local OCV (Open Circuit Voltage)" type condition in this region. The OCV-type degradation occurs when hydrogen peroxide and associated radicals are formed either by hydron diffusion through the membrane and reacting with oxygen at the cathode or oxygen diffusing through the membrane and reacting with hydrogen at the anode.

The present invention is directed to overcoming the above-mentioned problem of the chemical degradation.

BRIEF SUMMARY OF THE INVENTION

This object is solved by the membrane assembly, the method for manufacturing the membrane assembly and the fuel cell of the independent claims. Advantageous embodiments and practical improvements are subject-matter of the dependent claims.

The invention is based on the idea that the degradation, which is mentioned above, is turned off when there are no catalyst layers present in the region of the frame. In other words, it is part of the idea to form the membrane assembly in a way that the first catalyst layer and the frame are fully divided by the gap between them. In other words, the gap is supposed to separate the frame from the first catalyst layer. The gap may have an at least substantially constant width. Again, in other words, the width may be the distance by which the frame and the catalyst layer, especially the first catalyst layer, and the frame are separated from each other.

The present manufacturing method is suitable for manufacturing a membrane assembly for a fuel cell, which membrane assembly comprises a membrane with a first side and a second side, and a first catalyst layer arranged on the first side of the membrane and a second catalyst layer arranged on the second side of the membrane, wherein the first catalyst layer and the second catalyst are at least substantially fully overlapping each other with respect to their extension parallel to the membrane.

To allow an easy and cost effective way for manufacturing such a membrane assembly, it is envisaged that the manufacturing method comprises the following steps:

positioning a first decal layer, which is made of the same material as the first catalyst layer, on the first side of the membrane, positioning a second decal layer, which is made of the same material as the second catalyst layer, on the second side of the membrane, pressing a compression pad, which is positioned on the first decal layer with respective projections of the first decal layer and the second decal layer into a surface of the compression pad fully overlapping the compression pad, and the second decal layer against each other with the first decal layer and the membrane positioned in-between, whereby pressure on the first and the second decal layer is applied only in an area covered by the compression pad.

By the usage of the compression pad it is ensured, that the pressure or the pressing force respectively is applied only in the area covered by the compression pad. The present method is based on a decal transfer or in other words a decal transfer process. In other words, the first catalyst layer and the second catalyst layer are formed by arranging parts of the respective decal layer onto the respective side of the membrane. In other words by applying the pressure or the pressure force the first decal layer partly adheres to the first side of the membrane and the second decal layer partly adheres to the second side of the membrane. The part of the first decal layer adhering to the first side of the membrane forms the first catalyst layer. The part of the second decal layer adhering to the second side of the membrane forms the second catalyst layer. The adhering of the decal layers only takes part in the areas of the respective decal layers where the pressure or the pressure force is applied. In other words the shape and position of the first and the second catalyst layer depends mainly on the compression pad, in particular its shape and position. In other words the compression pad or its properties specify where the adhering of the respective decal layer takes part. Therefore by the compression pad or its properties it is specified or predetermined where the first and the second catalyst layer are formed during the step of pressing. The compression pad works like a stamp indirectly stamping both catalyst layers onto their respective side of the membrane.

For the membrane assembly it may also be preferable, if the first catalyst layer and the second catalyst layer are (at least substantially) fully overlapping each other with respect to their extension parallel to the membrane. In other words, the first and the second decal layer may have the (at least substantially) same projection into the plane of the membrane. For example the first and the second catalyst layer may have the (at least substantially) same size, extension and position parallel to the membrane. A precise equivalent positioning of both catalyst layers and both sides of the membrane is ensured by the pressing with the compression pad.

During the step of pressing the compression pad and the second decal layer against each other it as advantageous if both decal layers fully overlap the compression pad. In other words the first and second decal layer are both of bigger size in both directions parallel to the membrane. For example the first and second decal layer both overlap the compression pad positioned on the first decal layer for the pressing in every direction parallel to the membrane. Pressing the compression pad against the second decal layer the first catalyst layer may be stamped out of a middle of the first decal layer and the second catalyst layer may be stamped out of a middle of the second decal layer.

The present manufacturing method provides an easy way to produce a membrane assembly with a membrane and two catalyst layers on both sides of the membrane where both catalyst layers are precisely adjusted to each other regarding their position on the membrane and with a catalyst free edge in areas not covered by the compression pad. The first and the second decal layer can have much greater extension than the resulting membrane assembly. It is no careful alignment of the first catalyst layer or the second catalyst layer relative to each other or relative to the membrane necessary. In opposite the alignment of both catalyst layers relative to each other and the membrane is ensured by the compression pad. Therefore only the position of the compression pad relative to the membrane has to be aligned carefully prior to the pressing. But this is much easier to do than the alignment of the catalyst layers themselves.

According to a further development it is envisaged that the pressing is carried out with two pressing surfaces both overlapping the compression pad. In other words both pressing surfaces may be bigger than the compression pad. Hence the compression pad is to be aligned relative to the membrane independently from the two pressing surfaces. The only constraint to be taken into account is that the compression pad has to be fully in between both pressing surfaces. In other words the compression pad and therefore the first and the second catalyst layer all have to be positioned (fully) in between the two pressing surfaces. This leads to an execution of the method as less position or accuracy is necessary regarding the press or the pressing surfaces.

According to a further development of the invention it is envisaged that the pressing is carried out in a continuous process by two rollers pressing the compression pad and the second decal layer against each other. In other words the membrane can be supplied moving to the two rollers as well as both catalyst layers can be supplied from a different side of the membrane into the two rollers. So the membrane and the first and the second decal layer are supplied independently into the two rollers. On the other side of the two rollers the membrane assembly with both catalyst layers arranged on their respective side of the membrane leaves the rollers. The membrane and the decal layers can be supplied in form of a respective belt. On the other side of the two rollers a continuous belt of multiple membrane assemblies along a moving direction of the belt can be supplied. A continuous process is very effective for large scale productions of the membrane assembly.

According to a further development the compression pad is a protruding part of one of the two pressing surfaces or one of the two rollers. In other words the compression pad can easily be separated from the two pressing surfaces or the two rollers or be part of the pressing surfaces or the two rollers. The compression pad may be formed like a stamp protruding of one of the two pressing surfaces or one of the two rollers. It may also be envisaged that both pressing surfaces or both rollers comprise a respective compression pad.

According to a further development it is envisaged that the first decal layer forms the first catalyst layer only in an area of the first side of the membrane which is overlapped by the compression pad during the step of pressing the compression pad and the second decal layer against each other, and/or the second decal layer forms the second catalyst layer only in an area of the second side of the membrane which is overlapped by the compression pad during the step of pressing the compression pad and the second decal layer against each other. In other words the first decal layer and/or the second decal layer are only formed in the areas overlapped by the compression pad during the step of pressing. In other words the respective catalyst layer is stamped from the respective decal layer on the respective side of the membrane by the compression pad. Therefore the position and shape of the respective decal layers can easily be adjusted by the compression pad.

According to a further development of the invention it is envisaged that due to a size and/or the positioning of the compression pad relative to the membrane an edge region of the membrane remains free from the first catalyst layer and/or the second catalyst layer. In other words when pressing the compression pad and the second decal layer against each other the compression pad does not fully cover the membrane but the edge region of the membrane remains free from pressure. By remaining free from pressure the respective decal layers do not adhere to the membrane in the edge region. More particular the first decal layer does not adhere to an edge region on the first side of the membrane resulting in a catalyst free edge region of the membrane on its first side. Analogously the second decal layer may not adhere to the second side of the membrane in an edge region on the second side of the membrane resulting in a catalyst free edge region on the second side of the membrane.

The first and the second catalyst layer may each be formed rectangular on the respective side of the membrane. The edge region of the membrane which is free from catalyst layers may neighbour every side of the rectangular catalyst layer. In other words the first catalyst layer is formed rectangular with the catalyst free edge region neighbouring every side of the first catalyst layer. In other words the second catalyst layer may be formed rectangular with the catalyst free edge region neighbouring every edge of the second catalyst layer. Additionally or alternatively it may be envisaged that the first catalyst layer and/or the second catalyst layer are enclosed or encircled by the edge region of the membrane on their respective side of the membrane. Therefore the edges for the membrane are fully catalyst free.

Another aspect of the invention relates to the membrane assembly for a fuel cell, comprising:

a membrane with a first side and a second side, and a first catalyst layer arranged on the first side of the membrane and a second catalyst layer arranged on the second side of the membrane, wherein the first catalyst layer and the second catalyst are at least substantially fully overlapping each other with respect to their extension parallel to the membrane.

To allow an easy and cost effective way for manufacturing such a membrane assembly, the membrane assembly is characterized in that the first catalyst layer is formed from a first decal layer made of the same material as the first catalyst layer by decal transfer and the second catalyst layer is formed from a second decal layer made of the same material as the second catalyst layer by decal transfer, and the first and the second catalyst layer are formed by pressing a compression pad, which is fully overlapped by respective projections of the first decal layer and the second decal layer into a surface of the compression pad, and the second decal layer against each other with the first decal layer and the membrane positioned in between, whereby pressure is applied only in an area covered by the compression pad.

The membrane assembly is distinguishable from any other membrane assembly due to the different properties of the first and second catalyst layer as a result of the formation from the respective decal layer. Forming of the first and the second catalyst layer by means of the pressing also results in properties of the respective catalyst layer dependent from the compression pad. Especially position, form and shape of the first and second catalyst layer are dependent form a position, form and shape of the compression pad during the pressing.

According to a further development, it is envisaged that the first catalyst layer and the second catalyst are (at least substantially) fully overlapping with respect to their extension parallel to the membrane. In other words, the first and the second decal layer may have the (at least substantially) same projection into the plane of the membrane. For example the first and the second decal layer may have the (at least substantially) same size, extension and position parallel to the membrane. A precise equivalent positioning of both catalyst layers on both sides of the membrane is ensured by that and may crucial for a advantageous functioning of the membrane assembly or a fuel cell of which the membrane assembly is part of.

The resulting membrane assembly has already been discussed within the scope of the manufacturing method. The first catalyst layer and the second catalyst layer can be made of the same material. In this case, the first and the second decal layer can also be made from the same material. The first and the second catalyst layer can also be configured to enhance the transformation of the fuel into the electrical energy. The first and/or the second catalyst layer can be made of an electrically conductive material. Therefore they can be referred to as electrodes as well. The electrodes or catalyst layers can be configured to conduct the electrical energy or the electrical current to pose on the membrane assembly or a fuel cell respectively, when the membrane assembly is part of a fuel cell.

According to a further development it is envisaged that an edge region of the membrane is free from the first catalyst layer and/or the second catalyst layer. In other words the edge region of the membrane is catalyst free. This has been also discussed within the scope of the manufacturing method.

As the membrane assembly and the method for manufacturing the membrane assembly strongly relate to each other, features and advantages disclosed within the scope of the membrane assembly or the method do also apply onto the other. For the sake of brevity these features are not discussed twice.

A third aspect of the invention relates to a fuel cell with the above-mentioned membrane assembly. In other words, the fuel cell may comprise the above-mentioned membrane assembly. Again in other words, the fuel cell may comprise a membrane assembly which is manufactured with the above-mentioned manufacturing method.

The fuel cell can comprise one or more such membrane assemblies. The fuel cell can be stacked with other fuel cells to a fuel cell stack. The fuel cells of the fuel cell stack may be connected with without mechanically as well as electrically. The fuel from conversion into the electrical energy may flow through all fuel cells of the fuel cell stack. Also exhaust gases resulting of said conversion can be exhausted by the same exhaust. The fuel cells of the fuel cell stack can be electrically connected in parallel or in series or in a combination of both.

As a part of the fuel cell the membrane assembly is to be framed. This means a frame is arranged on the membrane. The frame is arranged on the catalyst-free edge of the membrane. This means the frame is spaced from the first and the second catalyst layer. Due to this spacing degradation of the free can be reduced or turned off.

The fuel cell may further comprise a housing which at least partly surrounds the membrane assembly. The fuel cell may comprise one or more gas diffusion layers for allowing the fusion of the fuel. A first gas diffusion layer can, for example, be arranged on the first catalyst layer. The first gas diffusion layer can also extend over the gap and/or the frame. In other words, the first gas diffusion layer may cover the first catalyst layer, the gap and the frame. A second gas diffusion layer can be arranged on the second catalyst layer. The second gas diffusion layer may extend over the whole second side of the membrane. Therefore, it may extend over the additional gap on the second side of the membrane and/or the additional catalyst layer.

Further advantages, features, and details of the invention derive from the following description of a preferred embodiment as well as from the drawings. The features and feature combinations previously mentioned in the description as well as the features and feature combinations mentioned in the following description of the figures and/or shown in the figures alone can be employed not only in the respectively indicated combination but also in any other combination or taken alone without leaving the scope of the invention.

DETAILED DESCRIPTION OF THE INVENTION

In the figures the same elements or elements having the same function are indicated by the same reference signs.

Figure 1:
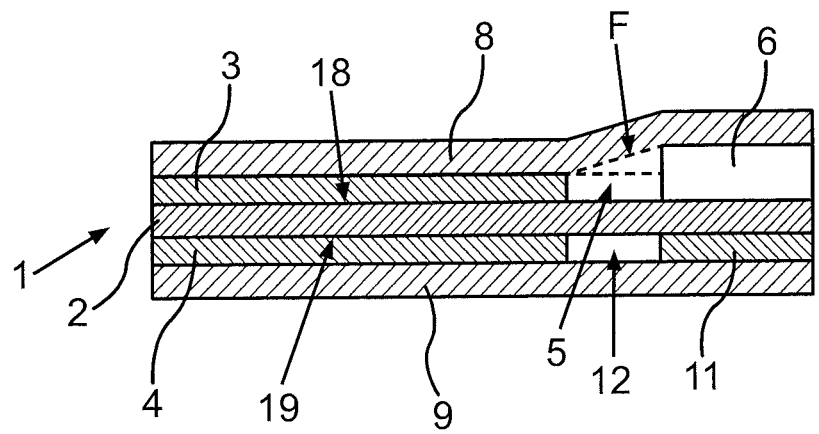
FIG. 1 a schematic cross section of a membrane assembly with an additional frame and additional gas diffusion layers.

FIG. 1 shows a membrane assembly 1 comprising a membrane 2 and catalyst layers 3, 4 on both sides 18, 19 of the membrane 2. On both sides the membrane assembly 1 is coated is with a gas diffusion layer 8, 9. The respective gas diffusion layers 8, 9 can be either considered a part of the membrane assembly 1 or not part of the membrane assembly 1. Also a frame 6 is arranged on the membrane 2 to provide sufficient stiffness for the membrane for usage in a fuel cell.

The membrane 2, which can also referred to as electrolyte, has a first side 18 and a second side 19. The membrane 2 can permeable or semi-permeable to enable an exchange of ions and/or molecules between the first side 18 and the second side 19. A first catalyst layer 3 is arranged on the first side 18 of the membrane 2. A second catalyst layer 4 is arranged on the second side 19 of the membrane 2. The frame 6 is arranged on the first side 18 of the membrane 2. The first catalyst layer 3 and the second catalyst layer 4 can be formed as electrodes. In other words, the catalyst layers 3, 4 can be configured to conduct an electrical current. The catalyst layers 3, 4 can be made of different or the same material. Both catalyst layers 3, 4 can be configured to catalyze a conversion from a fuel into electrical energy. For example, fuel and ambient air or oxygen can be converted to energy and exhaust gases by the catalyst layers 3, 4. When arranged in a fuel cell, the membrane assembly 1 can be arranged to carry out the conversion. The fuel cell can comprise one or more membrane assemblies 1, one or more frames 6 and a housing (not shown in the figures).

Catalytic reactions in and around the first catalyst layer 3 can lead to degradation processes at the frame 6. This may happen especially when the first catalyst layer 3 and the frame 6 face each other directly. In other words, the degradation especially occurs where the first catalyst layer 3 and the frame 6 touch each other or are at least very close to each other. The degradation can be a chemical degradation which is caused by a local open circuit voltage type condition in this area. The open circuit voltage type degradation occurs when hydrogen peroxide and associated radicals are formed by either hydrogen diffusing the membrane 2 and reacting with oxygen at the cathode or oxygen diffusing through the membrane 2 and reacting with hydrogen at the anode. This degradation pathway is turned off when there is no catalyst layer 3, 4 present in this area. Hence, there is a gap 5 between the frame 6 and the first catalyst layer 3. In other embodiments not shown in the figures, the frame 6 may be arranged on both sides 18, 19 of the membrane 2. For example, the frame 6 may consist of at least two parts, where a first part is arranged on the first side 18 and a second part is arranged on the second side 19. It is also possible that the frame 6 unfolds a match of the membrane 2 and therefore touches both sides 18, 19 of the membrane 2. If this is the case, the above-mentioned is also valid for the second catalyst layer 4 and the frame 6. Anyway, there is an additional gap 12 between the second catalyst layer 4 and a projection of the frame 6 into a plane of the second catalyst layer 4. In the present case, there is an additional catalyst layer 11 in the area of the projection of the frame 6 into the plane of the second catalyst layer 4.

A first gas diffusion layer 8 covers the first catalyst layer 3, the gap 5 and the frame 6. The region of a thought triangle above the gap 5 is also referred to as triangle region 7. In other words, all arrangements on the first side 18 are fully covered with the gas diffusion layer 8. In case there would be no gap 5, the triangle region would be located between the first catalyst layer 3, the first gas diffusion layer 8 and the frame 6. A second gas diffusion layer 9 is arranged on the second catalyst layer 4 and the additional catalyst layer 11. The second catalyst layer 9 also covers the additional gap 12. Analogously, the gap 5 is covered by the first gas diffusion layer 8.

Figure 2:
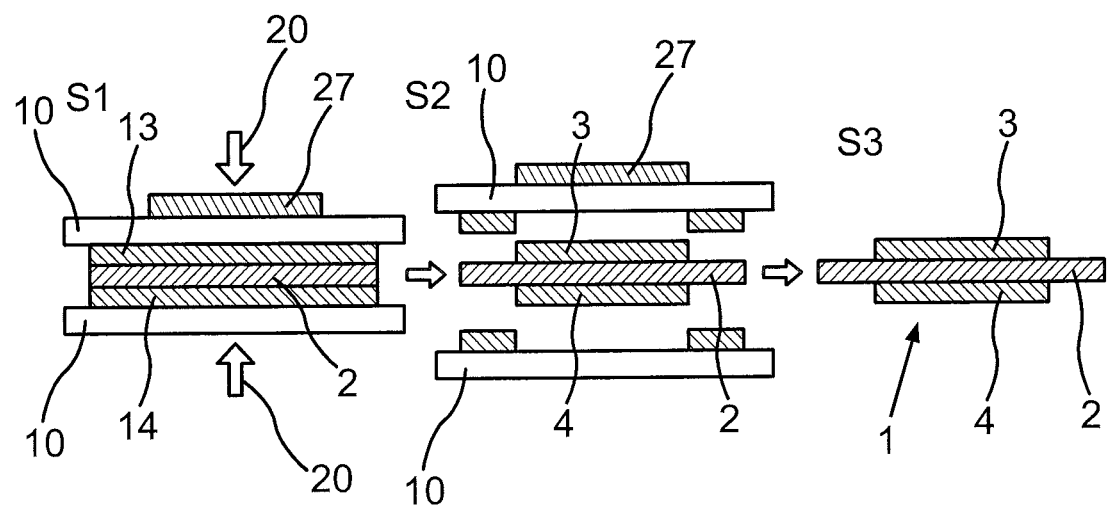
FIG. 2 exemplary steps for manufacturing the membrane assembly in a step-by-step diagram.

Now referring to FIG. 2 an example method for manufacturing the membrane assembly 1 is shown. In a first step S1 of the exemplary method, the membrane 2, a first decal layer 13 and a second decal layer 14 are positioned relative to each other. More precisely the second decal layer 14 is positioned on the second side 19 of the membrane 2. The first decal layer 13 is positioned on the first side 18 of the membrane 2. Both decal layers 13, 14 are arranged on a respective backer 10. The backer 10 or a substrate makes a handling of the respective decal layers 13, 14 easier. In other words the backer 10 facilitates the handling of the decal layers 13, 14.

In the first step S1 there is also a compression pad 27 positioned on the first decal layer 13. In this example the backer 10 of the first decal layer 13 is in between the compression pad 27 and the first decal layer 13. Respective projections of the first decal layer 13 and the second decal layer 14 into a surface of the compression pad 27 fully overlap the compression pad 27. In other words the compression pad 27 is positioned in a way that the projection of the first decal layer 13 into the surface of the compression pad 27 fully overlaps the compression pad 27. Also the compression pad 27 is positioned in a way that the projection of the second decal layer 14 into the surface of the compression pad 27 fully overlaps the compression pad 27. Again in other words both decal layers 13, 14 overlap the compression pad 27 in every direction parallel to the membrane 2. Hence the decal layers 13, 14 are both bigger than the compression pad 27 with respect to their extension parallel to the membrane 2. The compression pad 27 may be provided by a 0.5 mm thick silicone pad.

Also in the step S1 the whole arrangement of decal layers 13, 14, membrane 2 and compression pad 27 is pressed in a pressing procedure 20. By the pressing procedure 20 parts of the decal layers 13, 14 are getting firmly connected to the membrane 2. In other words the decal layers 13, 14 partly adhere to the membrane 2. In particular the first decal layer 13 gets partly attached to the first side 18 of the membrane 2. The part of the first decal layer 13 which gets attached to the membrane 2 forms the first catalyst layer 3. In particular, the second decal layer 14 gets partly attached to the second side 19 of the membrane 2. The part of the second decal layer 14 which gets attached to the membrane 2 forms the second catalyst layer 4. This can be seen in step S2. Therefore, the first decal layer 13 is made of the same material as the first catalyst layer 3. Analogously, the second decal layer 14 is made of the same material as the second catalyst layer 4. If both catalyst layers 3, 4 consist of the same material, the decal layers 13, 14 may be equal.

In the step S2 both decal layers 13, 14 are partly attached to the membrane 2. Both decal layers 13, 14 are only attached to the membrane 2 in their respective area, which is overlapped by the compression pad 27. In other words the adherents of the decal layers 13, 14 only takes part in their respective are overlapping with the compression pad 27. As it can be seen in step S1 both decal layers 13, 14 are overlapping the compression pad 27 into every direction parallel to the membrane 2. In other words by the pressing 20 the part of the decal layers 13, 14 forming the catalyst layers 3, 4 are getting punched out from the respective decal layers 13, 14. In particular the respective catalyst layers 3, 4 are getting stamped out from a middle of the respective decal layer 13, 14. This can also be seen in FIG. 4.

Figure 4:
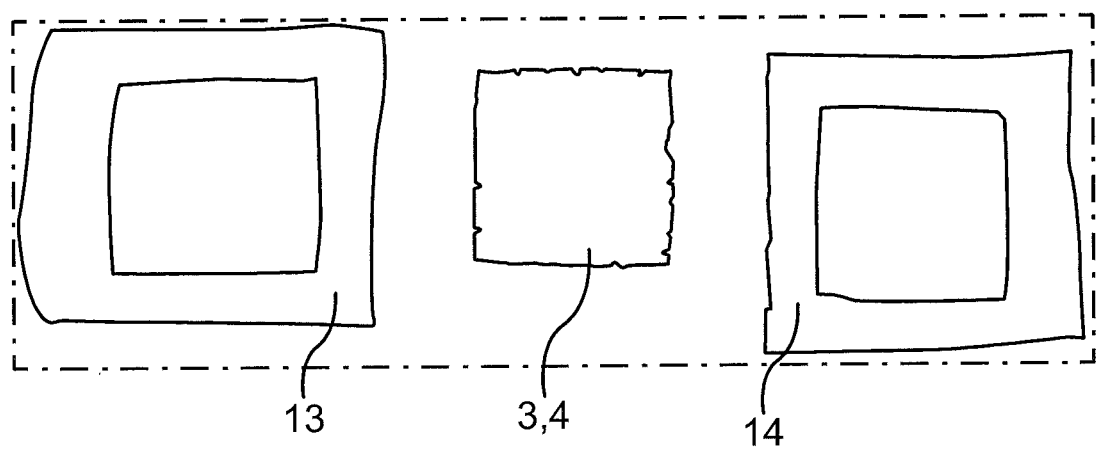
FIG. 4 a schematic top view on a membrane assembly with catalyst layers and a rest of decal layers from which the catalyst layers have been formed.

FIG. 4 shows a top view on a prototype of a membrane 2 with both catalyst layers 3, 4 pressed onto the membrane 2. On the left and the right of the membrane assembly with the catalyst layers 3, 4 the rest of the decal layers 13, 14 is shown. In particular FIG. 4 shows the rest of the first decal layer 13, where the rest of the decal layer 13, 14 has not adhered to the membrane 2. In other words the part of the decal layer 13 shown in FIG. 4 is the part of the decal layer 13 which was not covered or overlapped by the compression pad 27 during the pressing procedure 20. This applies analogously on the second decal layer 14. The part of the second decal layer 14 shown in FIG. 4 is the part of the second decal layer 14 which has not been adhered to during the pressing procedure 20.

Now referring back to FIG. 2, in step S2 it can be seen how the rest of the decal layers 13, 14 which does not adhere to the membrane 2 remains on the backer 10. In other words the part of the respective decal layers 13, 14 which do not overlap the compression pad 27 do not unstick from the respective backer 10. So the not adhering rest of the decal layers 13, 14 can be removed from the membrane 2 together with their respective backer 10. As a result of the manufacturing process FIG. 2 shows the step S3 with the fully manufactured membrane assembly 1.

The membrane assembly 1 obtained in step S3 can be used for building the fuel cell. For example it may be provided that the frame 6 and/or the first gas diffusion layer 8 and/or the second gas diffusion layer 9 are getting arranged on the membrane assembly 1 in further steps. Also the frame membrane assembly obtained from being framed may be put into the housing of the fuel cell. A multitude of framed membrane assemblies may be put mechanically into series to provide a fuel cell with more output.

Figure 3:
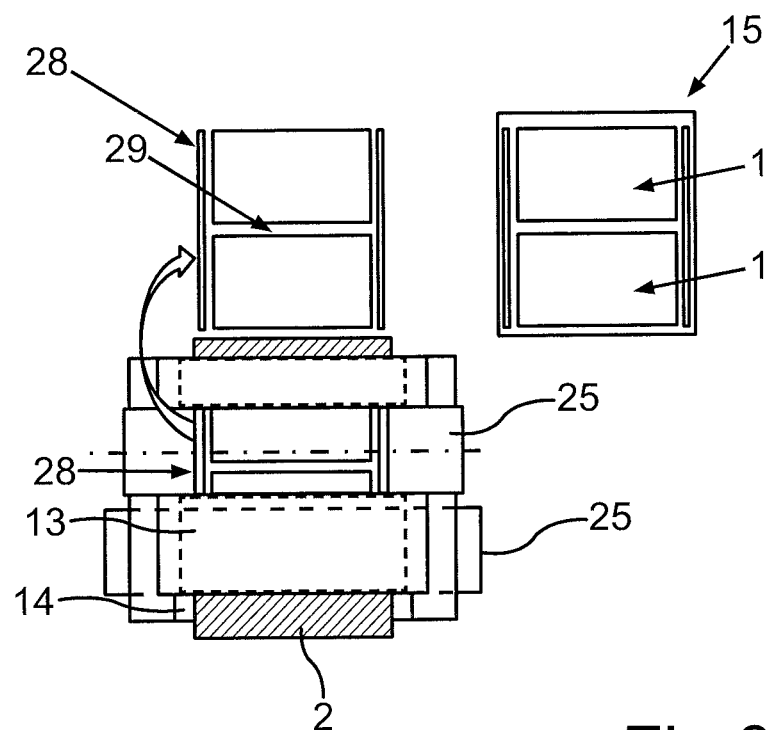
FIG. 3 a technical apparatus for performing the manufacturing method according to FIG. 2.

Now referring to FIG. 3 an exemplary apparatus for performing the present manufacturing method in a continuous process is shown. The apparatus comprises two rollers 25. On at least one of the rollers 25 the compression pad 28 is arranged. In comparison to FIG. 2 the compression pad 28 of the roller 25 of the apparatus comprises two compression pads 27. The compression pad 28 is arranged on a shell surface of the respective roller 25. By moving the membrane 2 and the decal layers 13, 14 through the rollers 25 the pressing procedure 20 is performed by the two rollers 25 and the compression pad 28. FIG. 3 also shows the compression pad 28 in unrolled form. The compression pad 28 comprises a gap 29 which provides an uncoated edge area between two membrane assemblies 1. This can be seen in FIG. 3 on the right. A continuous belt 15 of membrane assemblies 1 is the product of the manufacturing process with the apparatus. In other words the membrane 2 and the decal layers 13, 14 are getting into the apparatus or more precisely between the rollers 25 in a continuous belt each. On the other side a continuous belt 15 with the manufactured membrane assemblies 1 is leaving the apparatus or more precisely the rollers 25.

Figure 5:
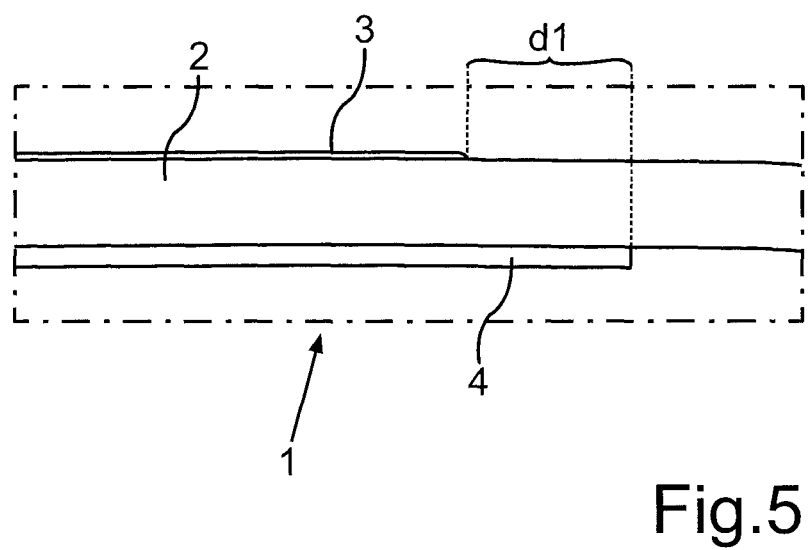
FIG. 5 a schematic representation of a prototype of the membrane assembly in a cross section.

Finally, FIG. 5 shows a cross section of an excerpt of the membrane assembly 1. FIG. 5 is a drawing of a prototype manufactured with the present manufacturing method according to FIG. 2 or FIG. 3. In FIG. 5 can be seen that both catalyst layers 3 and 4 are aligned to each other very well. The difference of size and/or alignment dl was approximately 30 μm. In other words, both catalyst layers 3, 4 are positioned opposite to each other within the neglectable tolerance of 30 μm. It should be mentioned that the given measure for dl is only exemplary. Nevertheless, a tolerance of 30 μm has proven to be useful in practical examples.

REFERENCE SIGNS 1 membrane assembly
2 membrane
3 first catalyst layer
4 second catalyst layer
5 gap
6 frame
7 triangle region
8 gas diffusion layer
9 gas diffusion layer
10 backer
11 catalyst layer
12 gap
13 decal layer
14 decal layer
15 belt
18 first side
19 second side
20 pressing procedure
25 roller
27 compression pad
28 compression pad
29 gap
S1-S3 method steps

The invention claimed is:

1. A method for manufacturing a membrane assembly for a fuel cell, which membrane assembly comprises
   a membrane with a first side and a second side, and
   first catalyst layer arranged on the first side of the membrane and a second catalyst layer arranged on the second side of the membrane,
   wherein the method comprises the following steps:
   providing a compression pad having the shape and size of the first and second catalyst layers to be formed,
   providing a first decal layer on a first backer, the first decal layer larger in size than the compression pad in two directions parallel to the decal layer,
   providing a second decal layer on a second backer, the second decal layer larger in size than the compression pad in two directions parallel to the decal layer,
   positioning the first decal layer, which is made of the same material as the first catalyst layer, on the first side of the membrane, so that the first decal layer is between the first backer and the first side of the membrane,
   positioning the second decal layer, which is made of the same material as the second catalyst layer, on the second side of the membrane, so that the second layer is between the second backer and the second side of the membrane,
   pressing the compression pad against the first backer so that pressure force causes a first decal layer part to adhere to the first side of the membrane and a second decal layer part to adhere to the second side of the membrane, the part of the first decal layer adhering to the first side of the membrane forming the first catalyst layer, the part of the second decal layer adhering to the second side of the membrane forming the second catalyst layer, the adhering of the decal layers only taking place in the areas of the respective decal layers where the compression pad pressure is applied, releasing the compression pad, removing the first and second backer, whereby the rest of the decal layers not adhered to the membrane and remaining on the backer are removed from the membrane together with their respective backer.

2. The method according to claim 1, wherein the pressing is carried out with the compression pad and an opposing pressing surface.

3. The method according to claim 1, wherein the pressing is carried out in a continuous process by two rollers.

4. The method according to claim 3, wherein the compression pad is a protruding part of the two rollers.

5. The method according to claim 1, wherein due to a size and/or the positioning of the compression pad relative to the membrane an edge region of the membrane remains free from the first catalyst layer and/or the second catalyst layer.

6. A membrane assembly for a fuel cell, comprising a membrane with a first side and a second side, and a first catalyst layer arranged on the first side of the membrane and a second catalyst layer arranged on the second side of the membrane, wherein the first catalyst layer is formed from a first decal layer made of the same material as the first catalyst layer by decal transfer and the second catalyst layer is formed from a second decal layer made of the same material as the second catalyst layer by decal transfer, and the first and the second catalyst layer are formed by:

providing a compression pad having the shape and size of the first and second catalyst layers to be formed, providing a first decal layer on a first backer, the first decal layer larger in size than the compression pad in two directions parallel to the decal layer, providing a second decal layer on a second backer, the second decal layer larger in size than the compression pad in two directions parallel to the decal layer, positioning the first decal layer on the first side of the membrane, so that the first decal layer is between the first backer and the first side of the membrane, positioning the second decal layer on the second side of the membrane, so that the second layer is between the second backer and the second side of the membrane, pressing the compression pad against the first backer so that pressure force causes a first decal layer part to adhere to the first side of the membrane and a second decal layer part to adhere to the second side of the membrane, the part of the first decal layer adhering to the first side of the membrane forming the first catalyst layer, the part of the second decal layer adhering to the second side of the membrane forming the second catalyst layer, the adhering of the decal layers only taking place in the areas of the respective decal layers where the compression pad pressure is applied, releasing the compression pad, removing the first and second backer, whereby the rest of the decal layers not adhered to the membrane and remaining on the backer are removed from the membrane together with their respective backer.

7. The membrane assembly according to claim 6, wherein an edge region of the membrane is free from the first catalyst layer and/or the second catalyst layer.

8. The membrane assembly according to claim 6, wherein the first catalyst layer and the second catalyst layer form an electrode each.

9. A fuel cell with at least one membrane assembly according to claim 6.

* * * * *